Feb. 11, 1941.     T. O. WILLIAMS     2,231,310
CLAMP CONNECTOR
Filed Feb. 6, 1939
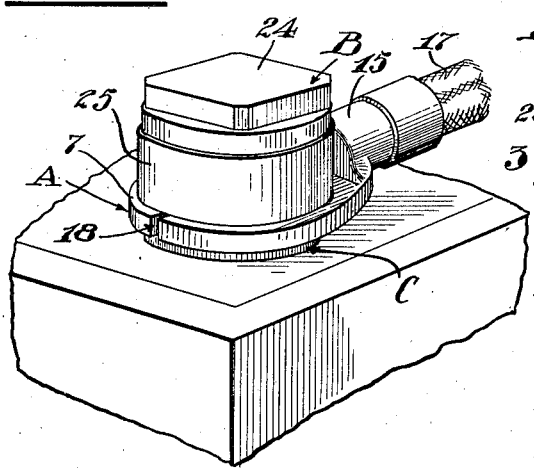
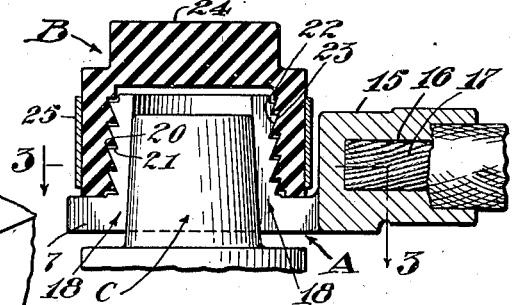
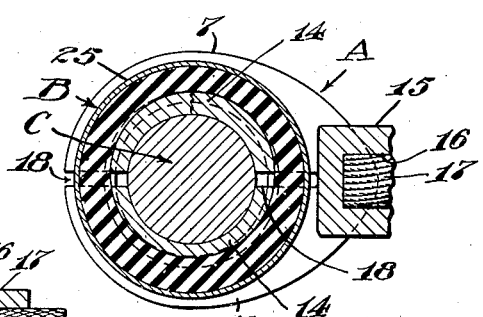
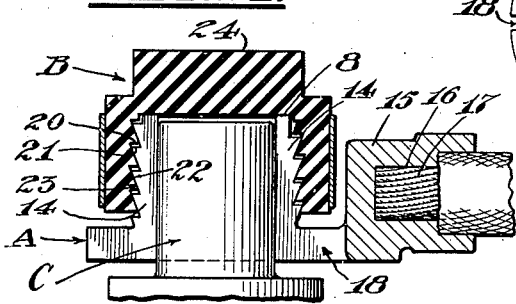
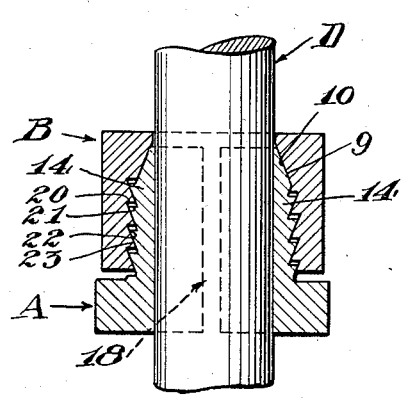
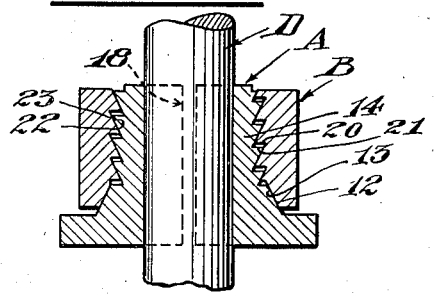
Inventor
Theodore O. Williams
By R. S. Berry
Attorney Patented Feb. 11, 1941

2,231,310

UNITED STATES PATENT OFFICE 2,231,310

CLAMP CONNECTOR

Theodore O. Williams, Los Angeles, Calif.

Application February 6, 1939, Serial No. 254,911

3 Claims. (Cl. 173—259)

This invention relates to a clamp connector of the type embodying a split threaded sleeve and a nut engageable with the sleeve and cooperating with the latter to effect contraction of the sleeve into clamping engagement with an element encompassed by the sleeve.

Devices of this character now generally in use embody an externally threaded sleeve that is tapered longitudinally in such fashion that on screwing a nut on the outer end portion of the sleeve, advancement of the nut along the taper in the direction of its diversion will act to effect contraction of the sleeve. This construction, while serviceable in some applications, is objectionable in others since the gripping action of the sleeve is largely localized to only that portion of its length, that is advanced inwardly at the point in the length of the taper thereof where the nut in advancing on the taper effects contraction of the sleeve. In other words, such clamps ordinarily are not effective throughout the entire length of the threaded tapered portions of the sleeve.

An object of the present invention is to provide a construction whereby contraction of an externally threaded split sleeve will be uniformly effected throughout the length thereof on screwing a nut thereon.

Another object is to provide a construction of a clamp of this character wherein contraction of the sleeve will occur and will be effected only after the nut has been screwed to a seated position thereon to fully encompass the sleeve whereby slight turning movement of the nut relative to the sleeve will effect tightening or loosening of the latter.

Another object is to provide a construction in the sleeve and nut which will obviate formation of the threaded portions thereof on a taper.
Another object is to provide a clamp connection which is especially applicable for use in effecting electrical connection between battery terminal posts and a cable, and in a fashion that will obviate corrosion of such connection such as is commonly occasioned by the emission of acid fumes from a battery.

With the foregoing objects in view, together with such other objects and advantages as may subsequently appear, the invention is carried into effect as illustrated by way of example in the accompanying drawing, in which:

Fig. 1 is a perspective view showing the invention as applied to a battery terminal connector;

Fig. 2 is a view in longitudinal section and elevation of the connector as shown in Fig. 1;

Fig. 3 is a view in horizontal section and plan taken on the line 3—3 of Fig. 2;

Fig. 4 is a view in section and elevation similar to Fig. 2 depicting a modified form of the connector as adapted for application to a cylindrical terminal;

Fig. 5 is a view in section and elevation showing the connector as adapted for application intermediate the ends of a rod or bar;

Fig. 6 is a view in section and elevation showing a modified form of the construction shown in Fig. 5.

Referring to the drawing more specifically A indicates generally an externally threaded split sleeve and B indicates an internally threaded nut which is screwable on the sleeve A to a limited extent; an abutment being provided on the split sleeve against which the nut is brought to rest in effecting operation of the clamp as will be hereinafter described. The abutment as shown in Fig. 2 comprises a flange 7 on one end of the split sleeve against which the inner end of the cap B may be brought to bear. In the construction shown in Fig. 4 the abutment is formed by the outer margin 8 of the split sleeve against which the outer end portion of the nut B may be brought to bear. In the construction shown in Fig. 5 the abutment comprises a tapered end portion 9 formed on the sleeve against which a correspondingly tapered inturned end flange 10 on the nut B may seat, and in the construction shown in Fig. 6, a tapered projection 12 at the base of a threaded portion of the sleeve serves for an abutment at the inner end of the nut which latter is internally beveled as indicated at 13 to conform with the taper 12.

The sleeve A is in the form of a divided externally threaded cylinder with the flange 7 projected outwardly from one end thereof whereby, in effect, the sleeve is composed of a pair of complementary semi-cylindrical sections each of which is fitted with a portion of the end flange 7. However in order to render the sleeve unitary in character the flange portions 7 on the semi-cylindrical sections 14 are united by being formed integral with a lug 15 which is here shown as fitted with a socket 16 in which is received an end of an electrically conductive cable 17; the socket and cable connection being employed where the clamp is utilized as a battery terminal connector.

By thus forming the sleeve A with the sections 14 thereof spaced apart to afford a gap 18 therebetween, as particularly shown in Fig. 3, the sections 14 are adapted to be advanced toward each other thus effecting contraction of the sleeve.

The essence of the invention resides in forming the split contractable cylindrical sleeve and also the cap B with screw threads of such formation that on screwing the cap on the sleeve to its abutting position relative thereto and thereafter further tightening the nut on the sleeve, a cooperative wedge action will be effected between the threads of the sleeve and the nut under outward longitudinal thrusts imparted to the nut such as to advance the sleeve sections 14 laterally toward each other. To accomplish this action the sleeve and nut are formed with buttress threads having side face 20 and 21 respectively extending perpendicular, or nearly so, relative to the outer cylindrical face or general contour of the sleeve represented by the base of the threads thereon; the buttress threads extending circumferentially of the sleeve and being intersected by the split thereof.

The perpendicular faces 20 and 21 of the threads are adapted to overlie each other when the nut is screwed on the sleeve but in slightly spaced relation to each other. The threads of the sleeve and nut are also respectively formed with complementary inclined faces 22 and 23 projecting outwardly at an acute angle relative to the general surface of the sleeve represented by the base of the threads thereon, such outward projection extending toward the tip of the sleeve where the entrance end of the threads thereon is located.

The interior of the sleeve A may be tapered as shown in Fig. 2 or may be of uniform diameter throughout as shown in Figs. 4, 5, and 6 according to the character of the elements to be engaged thereby, and the nut B may comprise a cap nut as shown in Figs. 1, 2, and 4, thus providing it with an end wall 24, or it may be open ended and in the form of an annulus as illustrated in Figs. 5 and 6. The cap type of nut is employed where the clamp is to be applied to the outer end portions of posts C such as battery terminals, and the annular type of nut is used where the clamp is to be applied to a post, rod or bar D intermediate the ends thereof and with an end portion thereof projecting through the nut as shown in Figs. 5 and 6.

Where the invention is applied to a battery terminal connector as shown in Figs. 1 to 4 the sleeve A is formed of an electrically conductive metal, while the nut B is formed of an electrically non-conductive material such as hard rubber, porcelain, or the like, and where formed of a material that is insufficiently strong to resist strains imposed on the side wall of the nut in contracting the sleeve A, a metallic reinforcing band 25 is arranged to encircle the threaded side wall of the nut in intimate contact therewith. By forming the nut of an insulating material it will serve when applied to a battery terminal to insulate the outer end of the latter and of the connector sleeve from contact with objects adjacent thereto which in event of contacting the terminal or the sleeve would effect short circuiting of the battery.

In the operation of the invention the sleeve A is positioned to encircle the element to be engaged thereby whereupon the nut B is screwed into place on the sleeve to its seated position thereon. The threaded connection between the sleeve and nut being cylindrical the nut may be freely screwed onto the sleeve to its seated position, especially if the threads of the nut are formed to have loose engagement with the threads of the sleeve which latter formation is desirable and permissible since the threaded connection between the nut and the sleeve initially serve merely to facilitate advancement of the nut on the sleeve to its seated position; it not being necessary or desirable that contraction of the sleeve occur during the operation of screwing the nut to its seated position on the sleeve. Thus on advancing the nut on the sleeve to the limit of its movement longitudinally thereof as determined by the abutment 7, 8, 9 or 12, no material contraction of the sleeve will be effected. In some instances when the parts are thus initially positioned the sleeve may be sufficiently loose on the element engaged thereby as to permit ready shifting and adjusting of the sleeve on the element engaged thereby.

When it is desired to contract the sleeve to effect the clamping action thereof, the nut B is advanced a short distance on its threaded connection with the sleeve after being seated on the latter so as to occasion a longitudinal outward thrust on the nut by reason of its advance on the sleeve being inhibited by the stop afforded by the abutment 7, 8, 9, or 12. This outward thrust on the nut causes the inclined faces 22 of the threads thereon to advance upwardly along the outwardly inclined faces 23 of the threads on the sleeve thereby exerting a wedge action throughout the length of the thread on the sleeve such as to contract the sleeve into clamping engagement with the element encompassed thereby and with but slight relative movement of the nut and sleeve. Slight retrograde movement of the nut on the sleeve will release the clamp.

While I have shown and described specific embodiments of the invention it is subject to further modification and accordingly the invention embraces such changes in the parts and in their construction, arrangement and combination as come within the meaning and scope of the appended claims.

I claim:

1. In a clamp connector, a split sleeve formed with a series of convolutions of screw threads having one side face thereof perpendicular or near perpendicular to the outer face of said sleeve and having the other side face thereof extending at an incline relative to the outer face of the sleeve to form a spiral wedge along the length of said sleeve, a nut having threads engageable with the threads on said sleeve, and an abutment on said sleeve against which said nut may be screwed to cause the threads on said nut to advance upwardly on the inclined side face of the threads on said sleeve to exert a wedge action between said threads and thereby effect contracting of the sleeve.

2. In a clamp connector, a split sleeve formed with a series of convolutions of screw threads having one side face thereof perpendicular or near perpendicular to the outer face of said sleeve and having the other side face thereof extending at an incline relative to the outer face of the sleeve to form a spiral wedge along the length of said sleeve, the threaded portion of said sleeve being of uniform outside diameter throughout, a nut having threads engageable with the threads on said sleeve, and a flange on said sleeve against which said nut is screwed to impose a thrust on the threads on said nut and advance said threads outwardly on the inclined side face of the threads on said sleeve to exert a wedge action between said threads and thereby effect contracting of the sleeve.

3. A clamp connector comprising a metallic sleeve having an externally threaded split cylindrical end portion, an internally threaded cap nut screwable on the cylindrical end portion of said sleeve; the threads on said sleeve and cap nut having spaced overlying side walls extending perpendicular to the outer face of the cylindrical end portion of said sleeve and having abutting inclined walls; said cap nut having an end wall, an end abutment on said sleeve for said end wall to limit the advance of the cap nut on the threads of said sleeve to cause the inclined walls of the threads on the cap nut to advance upwardly on the inclined faces of the threads on said sleeve to exert a wedge action between said threads and thereby effect contraction of said sleeve.

THEODORE O. WILLIAMS.